United States Patent [19]
Matsuhashi et al.

[11] Patent Number: 5,541,588
[45] Date of Patent: Jul. 30, 1996

[54] CONTROL SIGNAL TRANSFER DEVICE FOR A POSITION DETECTING SENSOR

[75] Inventors: Akira Matsuhashi; Masaaki Sato; Teruo Yajima, all of Tokyo, Japan

[73] Assignee: Metrol Co., Ltd., Tokyo, Japan

[21] Appl. No.: 283,770

[22] Filed: Aug. 1, 1994

[51] Int. Cl.⁶ .................................................. G08C 19/16
[52] U.S. Cl. ............................ 340/870.01; 340/870.3; 340/870.4; 340/539; 340/680; 455/300; 33/561; 901/10
[58] Field of Search ............... 340/870.01, 870.31, 340/870.16, 870.3, 870.4, 539, 680, 686, 687; 455/128, 300, 301, 347; 73/866.5; 324/149; 307/119; 33/559, 560, 561; 901/9, 10, 35, 46

[56] References Cited

U.S. PATENT DOCUMENTS 4,864,294 9/1989 Fukuhisa ........................... 340/870.01
5,109,223 4/1992 Schmitt et al. ....................... 340/870.31

*Primary Examiner*—Brent A. Swarthout
*Assistant Examiner*—Andrew Hill
*Attorney, Agent, or Firm*—Kanesaka & Takeuchi

[57] ABSTRACT

A control signal transmitting device is used for a control device, such as a position detecting device. The transmitting device includes a position detecting sensor, and a receiving device situated near the position detecting sensor. The position detecting sensor includes a sensing device, a radio wave transmitting device electrically connected to the sensing device, and a device for directing the radio wave in one direction. The radio wave transmitting device emits radio wave in a direction opposite the sensing device upon receiving a signal from the sensing device. The receiving device includes a radio wave receiving device disposed to face the radio wave transmitting device for receiving the radio wave transmitted from the transmitting device, and a shielding device for covering the receiving device to receive the radio wave from one direction.

8 Claims, 3 Drawing Sheets

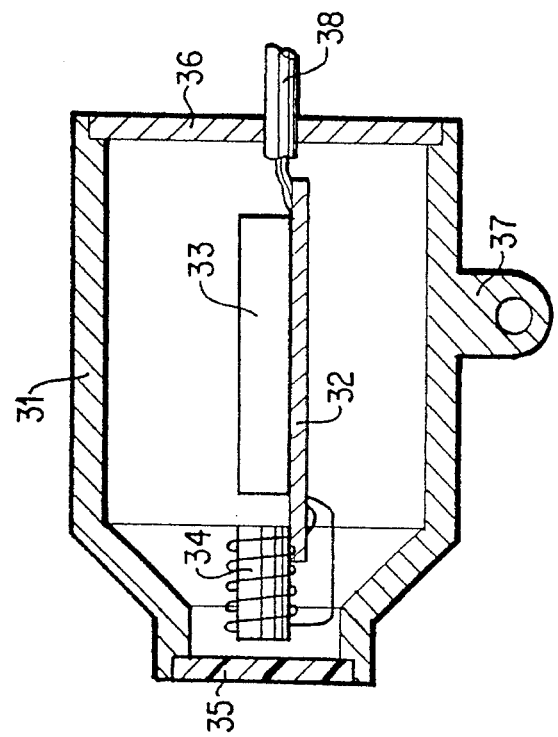
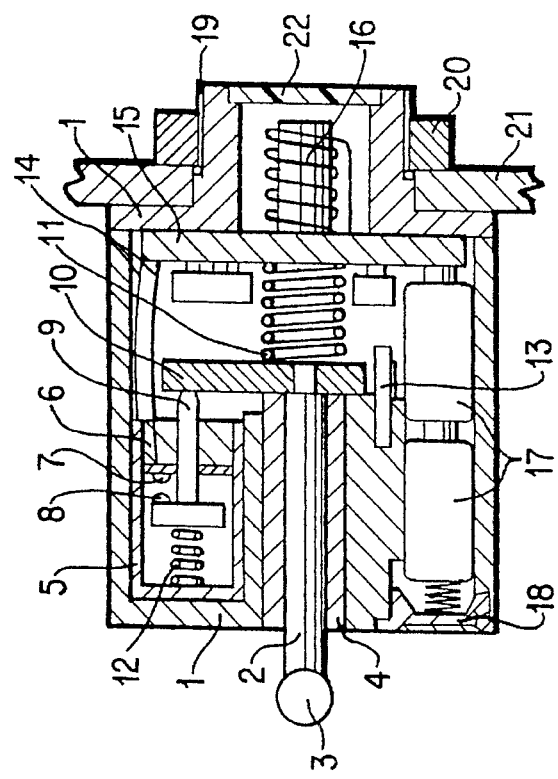
FIG. 1(a)
FIG. 1(b)

CONTROL SIGNAL TRANSFER DEVICE FOR A POSITION DETECTING SENSOR

BACKGROUND OF THE INVENTION AND RELATED ART STATEMENT

The present invention relates to a control signal transfer device, which transfers electric ON/OFF information transmitted from a position detecting sensor to a receiving device through radio wave, to thereby control a position of a work or a machine.

Conventionally, in order to transfer electric ON/OFF information, i.e. signal, transmitted from a position detecting sensor to a control or receiving device, an electric wire is installed between the position detecting sensor and the control device. However, the electric wire may possibly be cut. Especially, in case an attaching surface of the position detection sensor is irregular or in a turret form, the electric wire may be turned or tangled. Thus, a wireless device for transmitting a signal has been utilized.

The first method in the wireless transmitting methods uses dielectric coupling. In this method, an induction coil, to which alternate current is supplied through the control device, is located adjacent to an induction coil provided in a position detecting sensor to form electromotive force. Inductance of the induction coil in the position detecting sensor is changed due to ON/OFF operation of a switch of the position detecting sensor, by which the alternate current is changed. The change of the alternate current is detected and amplified to thereby control the control device.

As the second method in the wireless transmitting methods, an infrared irradiation device, such as LED, is formed in a main body of a position detecting sensor. An ON/OFF signal outputted from the position detecting sensor is changed to electric current, which is then supplied to the infrared irradiation device to output a light signal. The light signal is received by a light receiving device situated away from the position detecting sensor, and is changed again to electric signal, which is amplified to supply control current to the control device.

As the third method in the wireless transmitting methods, an ON/OFF signal obtained from the position detecting sensor is changed to radio wave by, for example, FM modulation, which is outputted from a transmitting antenna installed on the position detecting sensor. The radio wave is received by a receiving antenna situated away from the position detecting sensor, and is detected and amplified to supply control current to the control device.

One of the wireless device is disclosed in U.S. Pat. No. 4,339,714.

In the first method, the distance between the induction coil of the position detecting sensor and the induction coil formed at the control device is very narrow, such as 1 mm. Thus, in case metal powder, such as iron powder, is filled or clogged in the gap between the two induction coils facing each other, induction rate changes to cause malfunction of the control operation.

In the second method, cutting oil or powder may attach to the irradiation device and the light receiving device, or cross a light path. As a result, light transferred to the light receiving device is reduced or completely shut off, so that control may not be made completely.

In the third method, there is no possibility of trouble by the cutting oil or cutting powder as in the first and second methods, but there is a time lag until starting the operation of an oscillation circuit for the radio wave and receiving, detecting and amplifying circuits. Thus, the problem lies in a time lag or rise time from the output of the ON/OFF signal to the operation of the control circuit.

For example, in case a transmitting speed for a cutting blade, such as bit, is 100 mm/min., it is required that the rise time for obtaining an accuracy of 1 micrometer is less than 0.6 milli-second.

Further, it is required to prevent malfunction of the control device in case there is a radio wave shielding material in a middle of the transmitting antenna and the receiving antenna. For this purpose, the output of the radio wave must be increased, and the receiving sensitivity must be raised. As a result, in case the same kind of devices are installed parallel to each other, the radio waves are interfered or mixed to cause error operation.

Therefore, it is required to solve the problems by, such as changing frequencies in each model, to thereby increase cost of the devices. Further, in case sensitivity for receiving the radio wave is raised, other radio waves may be caught by the receiving antenna, which may cause error operation.

It is therefore an object of the invention to provide a control signal transfer device for a position detecting sensor, which can prevent radio interference among the same devices as well as other radio waves by using very weak radio wave for a short distance as a transmission medium.

Another object of the invention is to provide a control signal transfer device as stated above, wherein rise time of the circuits is shortened by simplifying the circuits.

A further objects of the invention is to provide a control signal transfer device as stated above, wherein the device is economical and easy to use, and is not affected by cutting oil and cutting powders.

Further objects and advantages of the invention will be apparent from the following description of the invention.

SUMMARY OF THE INVENTION

In the present invention, a control signal transfer device for a position detecting sensor includes means for emitting radio waves from an end portion of a housing, which is formed in the housing of the position detecting sensor, and means for receiving the radio waves formed at a position opposite the end portion of the housing and at a predetermined distance away from the end portion. The electric ON/OFF information signal outputted from the position detecting sensor is transferred to a control circuit formed outside the housing through radio waves between the emitting means and the receiving means. The end portion of the housing is protected by a cover made of a material for permitting the radio waves to pass therethrough.

The housing of the position detecting device is installed on an attaching surface of a machine, such as cutting machine. When the machine is used and moved, a measuring arm of the position detecting sensor touches a work or table to change the position of the arm. As a result, a switching mechanism operates to output an ON/OFF signal, so that an oscillation circuit operates, and radio wave is emitted from a transmitting antenna installed in the housing.

The emitted radio wave is received by a receiving antenna provided at the opposite side of the transmitting antenna, and is detected and amplified to control a control circuit for the work or table.

BRIEF DESCRIPTION OF THE DRAWINGS

FIG. 1(a) is a section view of a position detecting sensor of a first embodiment of the invention;

FIG. 1(b) is a section view of a control device of the invention;

DETAILED DESCRIPTION OF PREFERRED EMBODIMENTS

Figure 2B:
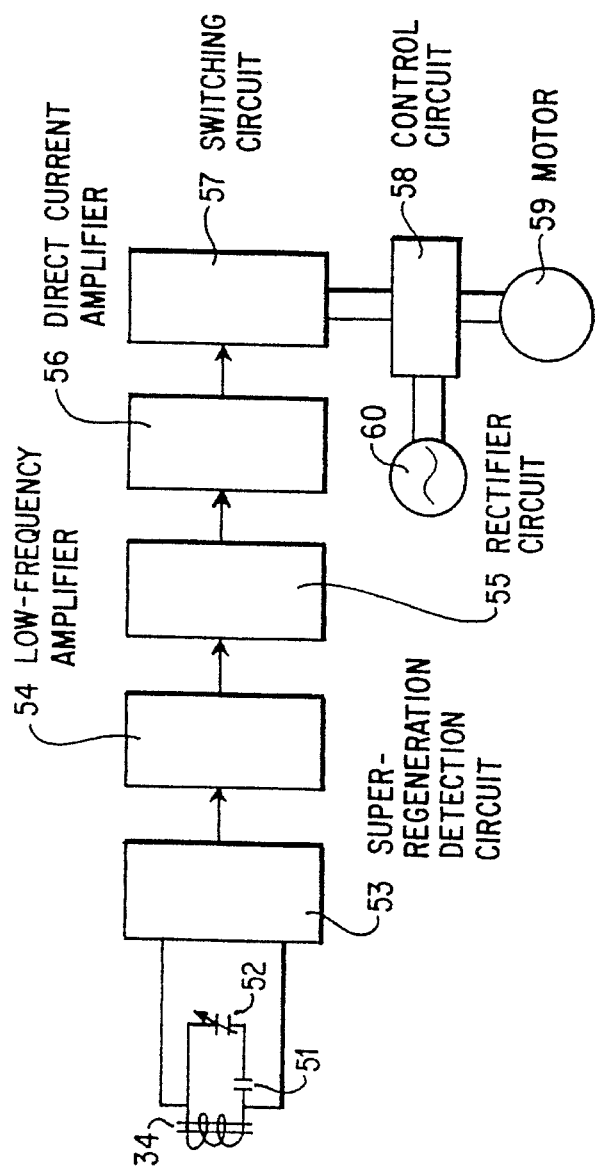
FIG. 2(b) is a block diagram of the control device.

FIGS. 1(a), 1(b), 2(a) and 2(b) show a first embodiment of the invention. FIG. 1(a) is a front section view of a position detecting sensor.

A housing 1 is made of a material, such as metal, for shielding radio wave, and a measuring arm 2 having a contact 3 at a front end thereof is formed to project from the housing 1. The measuring arm 2 is held by a bearing portion 4 formed in the housing 1.

A switch body 5 is situated in the housing 1, and includes a lid 6 having a fixed contact point 7. The center of the lid 6 forms a bearing portion for an actuator 9 in a T shape in a cross section. The actuator 9 includes a movable contact point 8 facing the fixed contact point 7.

An operation plate 10 is fixed at a right end of the measuring arm 2 (FIG. 1(a)), and is urged by a strong spring 11 so that the arm 2 is always urged in the left direction. The actuator 9 is also urged by the operation plate 10 in the left direction opposite the force of a weak spring 12, so that the movable contact point 8 is separated from the fixed contact point 7. The operation plate 10 is fixed to the housing 1 by a pin 13 to prevent rotation thereof.

Figure 2A:
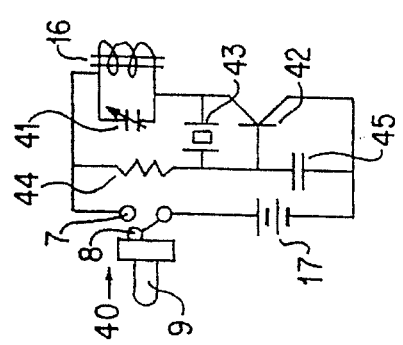
FIG. 2(a) is a circuit diagram of the position detecting sensor of the first embodiment of the invention.

A printed board 15 for retaining thereon electric circuits at the side of the position detecting sensor, which are shown in FIG. 2(a), is fixed to the housing 1 by screws (not shown). Lead wires 14 extending to the contact points 7, 8 are fixed to the board 15. The board 15 is provided with the electric circuits and a transmitting antenna 16, which is formed by winding coils over ferrite in the form of a rod.

Batteries 17 are disposed in the housing 1, and a cover 18 covers the batteries 17.

The housing 1 includes threads 19 on the right side, so that the housing 1 is attached to an attaching portion 21 of a machine, such as a cutting machine, by means of a nut 20. A cover 22 made of a material for allowing radio waves to pass therethrough, such as plastic, is attached to the housing 1 to seal the housing.

FIG. 1(b) shows a section view of the control device including a radio wave receiving device. The control device includes a main body 31 formed of a material to shield radio waves, such as metal, and a printed board 32 fixed to the main body 31. The printed board 32 is provided with circuit members 33, and a receiving antenna 34 formed by winding coils over ferrite in the form of a rod. A cover 35 made of a material for allowing radio waves to pass therethrough, such as plastic, is attached to the main body 31 to seal the same.

Further, the main body 31 includes a rear lid 36, and an attaching plate 37. A lead wire 38 connects the printed board 32 to a control section and an electric source.

When the sensor and the control device are installed, the transmitting antenna 16 and the receiving antenna 34 are spaced apart from each other at several tens millimeters. Since the housing 1 and the main body 31 are made of materials for shielding radio waves, such as metal, the radio wave emitted from the transmitting antenna 16 does not spread widely and is received by the receiving antenna 34.

FIG. 2(a) shows a circuit for the position detecting sensor. A switch 40 is formed of the fixed contact point 7, the movable contact point 8, and the actuator 9. The transmitting antenna 16 is an oscillating coil formed by winding the coils over the rod shape ferrite. The oscillating coil operates as the antenna 16. The circuit includes a trimmer capacitor 41, an oscillation transistor 42 and quartz oscillator 43. For example, 40 MHz is used as an oscillating cycle.

FIG. 2(b) shows a circuit diagram for the control device. The circuit includes the receiving antenna formed by winding the coils over the rod shape ferrite, a capacitor 51 and a trimmer capacitor 52. The circuit further includes a super-regeneration detection circuit 53, a low-frequency amplifier 54, a rectifier circuit 55, a direct current amplifier 56, a switching circuit 57, a control circuit 58, e motor 59 and a commercial electric source 60.

Next, an operation of the present invention is explained. When a work or table (not shown) moves and touches the contact 3, the measuring arm 2 and the operation plate 10 move from the position as shown in FIG. 1(a) to the right direction, so that the actuator 9 is moved in the right direction by the spring 12. As a result, the movable contact point 8 contacts the fixed contact point 7, whereby the oscillation circuit as shown in FIG. 2(a) operates to emit radio wave from the transmitting antenna 16.

The radio wave transmitted from the antenna 16 is received by the receiving antenna 34. As shown in FIG. 2(b), the signal from the antenna 34 is detected by the super-regeneration detection circuit 53, and after low-frequency of the signal is amplified by the low-frequency amplifier 54, it is rectified by the rectifier circuit 55. Then, the signal is amplified by the direct current amplifier 56, and is outputted to the control circuit 58 through the switching circuit 57. In the control circuit, electricity for operating the work or table, i.e. motor 59, is shut off, and if required, a brake is applied to the motor 59, to thereby stop the motor 59. As a result, the position of the work or table can be set properly.

Experiments is made in the condition that 32 MHz of the quartz oscillator 43 is used, the distance between the transmitting antenna 16 and the receiving antenna 34 is between 50 and 100 mm, and the moving speed for the work or table is 100 mm/min. As a result, it is possible to stop the work or table at the accuracy of 1 micrometer in average.

In the above embodiment, the measuring arm 2 of the position detecting sensor is formed to move in one, i.e. right direction in FIG. 1(a). However, it is possible to move the measuring arm 2 by combining two or three forces in different directions.

Figure 3:
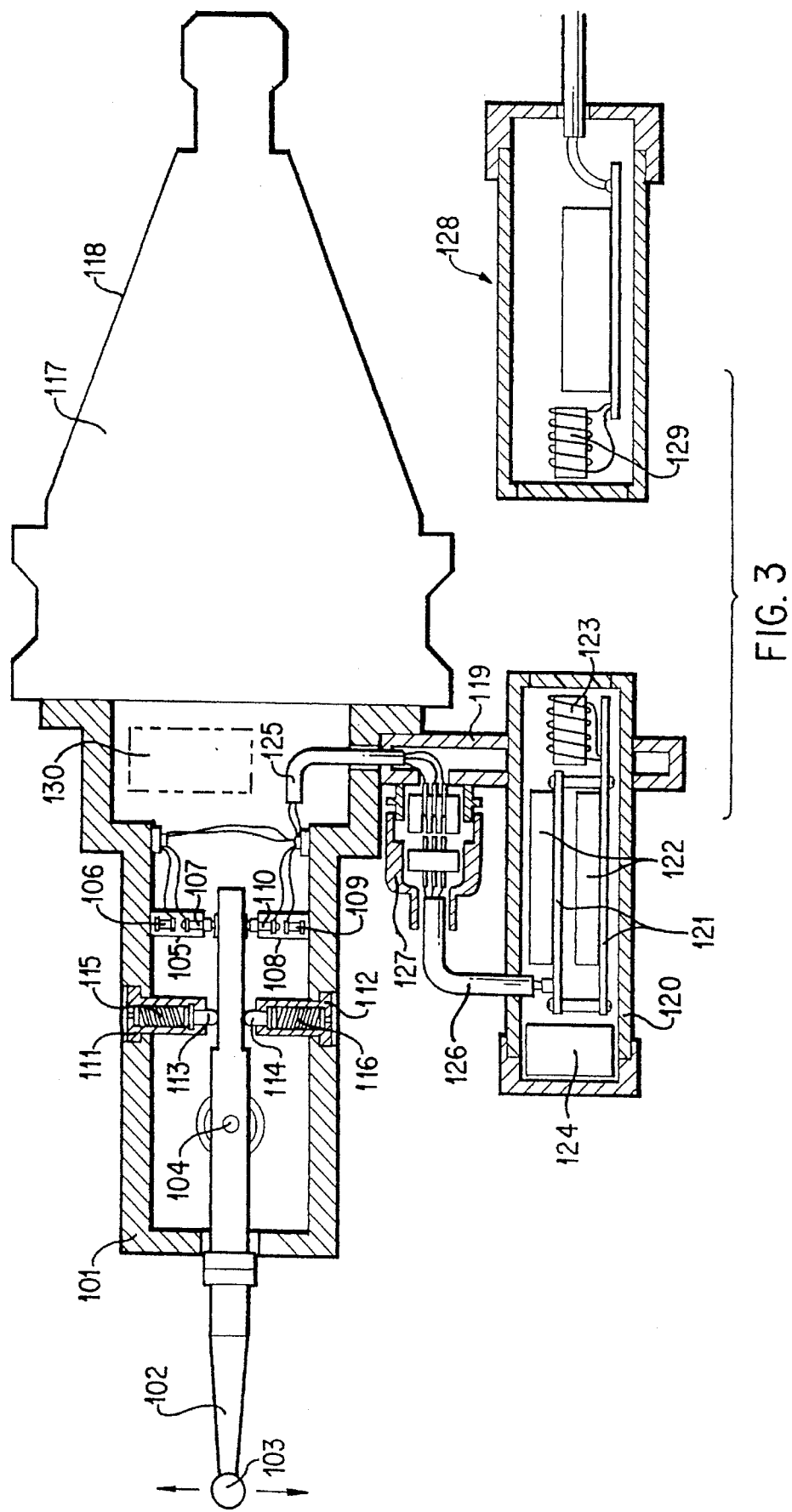
FIG. 3 is a section view of a position detecting sensor and a control device of a second embodiment of the invention.

FIG. 3 shows a second embodiment of the invention. In the first embodiment as shown in FIG. 1(a), a sensing section including the components from the measuring arm 2 to the lead wires 14, and a transmitting section including the components from the printed board 15 to the batteries 17 are all retained in the housing 1. In the second embodiment, however, a housing for the sensing section and a case for the transmitting section are formed separately.

In particular, the sensing section includes a housing 101, in which a measuring arm 102 having a contact 103 is supported by a supporting shaft 104 penetrating through an inner wall of the housing 101. A first location detecting section 105 is formed inside the housing 101, and includes a first fixed contact point 106 and a first movable contact point 107, which are separated by a spring (not shown) in a normal condition.

Also, a second location detecting section 108 is formed inside the housing 101 opposite the first location detecting section 105. The second location detecting section 108 includes a second fixed contact point 109 and a second movable contact point 110, which are separated by a spring (not shown) in a normal condition.

Center positioning devices 111, 112 are formed in the housing 101 symmetrically relative to the central plane of the housing 101 for returning or positioning the measuring arm 102 in the center position. The center positioning devices 111, 112 are formed of pushers 113, 114 and springs 115, 116. The central line passing through the first and second location detecting sections 105, 108 is parallel to the center line passing through the center positioning devices 111, 112, and is arranged normal to the supporting shaft 104.

The housing 101 also includes a shank 117 having a tapered portion 118, which can be fixed to a tapered hole formed in a machine when installed in the machine.

A connecting portion 119 is attached at one end to the housing 101 and at the other end to a case 120 of the transmitting section. The case 120 includes therein circuit boards 121, to which circuit elements 122 and a transmitting antenna 123 are fixed, and a battery 124.

In FIG. 3, lead wires 125, 126 are attached to the housing 101 and the case 120, respectively, and are connected together by a connector 127. A side wall of the case 120 is made of a material for preventing radio wave from passing therethrough, and a front end of the case 120 is made of a material for allowing radio wave to pass therethrough, such as plastic.

A control device 128 is the same as in the control device shown in FIG. 1(b), including a receiving antenna 129. A side wall of the case of the control device 128 is made of a material for preventing radio wave from passing therethrough, and a front end of the case is made of a material for allowing radio wave to pass.

The circuits of the position detecting sensor and the control device of the second embodiment are the same as in the first embodiment. Thus, the explanation thereof is omitted.

In the second embodiment, for example, when the contact 103 touches a work or table to move in the downward direction in FIG. 3, the measuring arm 102 rotates in a counterclockwise direction as the center of the support shaft 104, so that the movable contact point 107 contacts the fixed contact point 106. Consequently, an ON signal is transmitted to the transmitting circuit elements 122, and radio wave is emitted from the transmitting antenna 123 through the circuits as explained in FIG. 2(a). The emitted radio wave is received by the receiving antenna 129 of the control device 128, and is processed as explained in FIG. 2(b) to control the work or table.

In the second embodiment, the control device 128 can be installed freely when comparing the first embodiment. Also, in the second embodiment, the work or table can be maintained within a specific range because of the two switches.

As explained above, the switches, i.e. fixed contact point 7 and movable contact point of FIG. 1 and fixed contact points 106, 109 and movable contact points 107, 110 of FIG. 3, are explained as normal-open switches, but these switches may be normally closed and output OFF signals. In this case, the control device may receive radio wave all the time, and when stop of the radio wave is detected, the control mechanism may be operated. In order to prevent loss of battery life, as soon as an OFF signal is detected, the switching circuit may be operated to emit radio wave.

Further, in case radio wave is emitted all the time, and the radio wave is shut off when receiving an ON or OFF signal, it is possible to shorten rise time for the circuits to thereby increase the accuracy. In this case, in experiments, the rise time of 5 micro second was obtained. In case a transmitting speed of a work or table is 100 mm/min., theoretically, it is possible to obtain the accuracy of 0.8 micro meter. In this case, since a life of the battery is shortened, a large capacity of a battery may be formed in the housing of the sensor as indicated in numeral 130 in FIG. 3.

In the present invention, the transmitting antenna and the receiving antenna are formed closely to face each other, and transmission and reception of the radio waves except for the direction of the facing antennas are shielded. Thus, even if the same devices are installed close to each other, interference or mixing of the radio waves is prevented. It is unnecessary to change the models of the devices when installing close to each other. Also, the possibility of interference by other radio wave is very low, so that the machine can be controlled reliably.

Also, the oscillation circuit which delays the rise time of the circuit is simplified, so that the rise time of the circuit is made quickly. Accuracy of 1 micrometer may be controlled. Further, since the oscillation circuit which requires electricity is simplified as stated above, battery consumption is low. Thus, maintenance of the device is easy. Moreover, since the position detecting sensor and the antenna of the receiving section are sealed, it is not affected by cutting oil and cutting powder. Thus, the invention is especially useful for a control signal transfer device for a metal processing machine, such as cutting machine.

While the invention has been explained with reference to the specific embodiments of the invention, the explanation is illustrative, and the invention is limited only by the appended claims.

What is claimed is:

1. A control signal transmitting device for a control device, comprising:

a position detecting sensor including a sensing device, a radio wave transmitting device electrically connected to the sensing device, said radio wave transmitting device emitting radio wave upon receiving a signal from the sensing device, a hollow housing completely surrounding a side surface of the radio wave transmitting device, said housing being made of a material to prevent the radio wave from passing therethrough and having an opening for permitting the radio wave to exit therefrom, and a lid covering the opening and being made of a material to allow the radio wave to pass therethrough so that the radio wave transmitting device is completely covered and the radio wave exits in one direction through the cover, and a receiving device situated near the position detecting sensor and including a radio wave receiving device disposed to face the radio wave transmitting device for receiving the radio wave transmitted from the transmitting device, a hollow casing completely surrounding a side surface of the radio wave receiving device, said casing being made of a material to prevent the radio wave from passing therethrough and having an opening for permitting the radio wave to enter therethrough, and a lid for covering the opening and being made of a material to allow the radio wave to pass therethrough so that the receiving device is completely covered and receives only the radio wave ejected from the radio wave transmitting device.

2. A control signal transmitting device according to claim 1, wherein said radio wave transmitting device is located behind the sensing device, said housing covering the radio wave transmitting device and the sensing device.

3. A control signal transmitting device according to claim 2, wherein said sensing device includes a measuring rod having a contact point, and a switch connected to the measuring rod so that when the measuring rod is moved, the switch is actuated to permit the radio wave transmitting device to output a signal.

4. A control signal transmitting device according to claim 3, wherein said radio wave transmitting device has an oscillation coil as a transmitting antenna.

5. A control signal transmitting device according to claim 1, wherein said sensing device includes a cover for covering the same, said radio wave transmitting device being located at a lateral side of the sensing device and said housing being connected to the cover of the sensing device.

6. A control signal transmitting device according to claim 5, wherein said sensing device includes a measuring rod having a contact point, and a switch connected to the measuring rod so that when the measuring rod is moved, the switch is actuated to permit the radio wave transmitting device to output a signal.

7. A control signal transmitting device according to claim 6, wherein said switch includes two detecting switches for sensing movement of the contact point in two directions.

8. A control signal transmitting device according to claim 7, wherein said radio wave transmitting device has an oscillation coil as a transmitting antenna.

* * * * *